United States Patent
Maheshwari et al.

(10) Patent No.: US 12,158,524 B2
(45) Date of Patent: Dec. 3, 2024

(54) GENERATING SCAN PATTERNS USING COGNITIVE LIDAR

(71) Applicant: Luminar Technologies, Inc., Orlando, FL (US)

(72) Inventors: Pranav Maheshwari, Palo Alto, CA (US); Vahid R. Ramezani, Los Altos, CA (US); Benjamin Englard, Palo Alto, CA (US); István Peter Burbank, Orlando, FL (US); Shubham C. Khilari, Palo Alto, CA (US); Meseret R. Gebre, Palo Alto, CA (US); Austin K. Russell, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 938 days.

(21) Appl. No.: 17/121,723

(22) Filed: Dec. 14, 2020

(65) Prior Publication Data
US 2022/0187463 A1    Jun. 16, 2022

(51) Int. Cl.
*G01B 11/26* (2006.01)
*G01S 7/48* (2006.01)
*G01S 7/481* (2006.01)
*G01S 17/88* (2006.01)
*G01S 17/89* (2020.01)
*G01S 17/931* (2020.01)
*G06N 20/00* (2019.01)

(52) U.S. Cl.
CPC ............ *G01S 17/89* (2013.01); *G01S 7/4808* (2013.01); *G01S 7/4817* (2013.01); *G01S 17/88* (2013.01); *G01S 17/931* (2020.01); *G06N 20/00* (2019.01)

(58) Field of Classification Search
CPC ....... G01S 7/4808; G01S 7/4817; G01S 17/88
See application file for complete search history.

(56) References Cited

U.S. PATENT DOCUMENTS

| | | |
|---|---|---|
| 10,768,304 B2 | 9/2020 | Englard et al. |
| 2018/0059248 A1* | 3/2018 | O'Keeffe ............... G01S 17/42 |
| 2018/0275658 A1* | 9/2018 | Iandola ................. G06F 30/20 |
| 2020/0025923 A1 | 1/2020 | Eichenholz |
| 2020/0074266 A1 | 3/2020 | Peake et al. |

FOREIGN PATENT DOCUMENTS

CN    111932671 A * 11/2020 ............ G06T 17/00

OTHER PUBLICATIONS

International Search Report and Written Opinion dated Mar. 22, 2022 for PCT/US2021/061585.

* cited by examiner

*Primary Examiner* — Mark Hellner
(74) *Attorney, Agent, or Firm* — Van Pelt, Yi & James LLP

(57) ABSTRACT

A method for determining a scan pattern according to which a sensor equipped with a scanner scans a field of regard (FOR) is presented. The method comprises obtaining, by processing hardware, a plurality of objective functions, each of the objective functions specifying a cost for a respective property of the scan pattern, expressed in terms of one or more operational parameters of the scanner. The method further includes applying, by the processing hardware, an optimization scheme to the plurality of objective functions to generate the scan pattern. The method further includes scanning the FOR according to the generated scan pattern.

19 Claims, 11 Drawing Sheets

GENERATING SCAN PATTERNS USING COGNITIVE LIDAR

FIELD OF THE DISCLOSURE

The present disclosure generally relates to object detection capabilities of autonomous vehicle systems and, more particularly, to accurately detecting and predicting lane boundary locations during autonomous vehicle operation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a sensor system is capable of scanning a FOR according to different scan patterns, it may be beneficial in some scenarios to vary the velocity at which the system scans one or multiple dimensions of the FOR, vary the coverage within the maximum available FOR, rescan a certain region of interest, and otherwise adjust the scan pattern based on the current environment. For example, the sensor system can be a lidar system operating in an autonomous vehicle and equipped with a scanner that directs light pulses at different angles to scan an FOR and generate corresponding pixels. The FOR of the lidar system can cover portions of the sky, that generally do not contain useful information, as well as portions of the road surface, for which relatively sparse data may be sufficient for the control architecture of the autonomous vehicle, as well as objects on the road, for which relatively dense data can yield better detection results. Moreover, objects may move across the FOR, and the control architecture may further benefit from scanning one or more "regions of interest" in a more dense manner, to thereby yield higher resolution, and/or from rescanning these regions of interest within the same frame.

SUMMARY

Generally speaking, using the techniques of the present disclosure, a system can determine a scan pattern according to which a sensor equipped with a scanner scans a field of regard (FOR). To this end, the system seeks to optimize objective functions corresponding to various properties of the scan pattern (e.g., velocity at which the system scans a dimension, the coverage of a certain area within the available FOR, or the effect of rescanning a line or dropping a line). The system can determine the scan pattern in view of certain constrains of the scanning system, such as a maximum velocity or acceleration of which the scanning system is capable. Further, the system can apply reinforcement learning techniques to account for higher-level goals, such as collision avoidance, when generating a scan pattern.

One example embodiment of these techniques is a method of determining a scan pattern according to which a sensor equipped with a scanner scans a field of regard (FOR) comprises obtaining, by processing hardware, a plurality of objective functions, each of the objective functions specifying a cost for a respective property of the scan pattern, expressed in terms of one or more operational parameters of the scanner. The method further comprises applying, by the processing hardware, an optimization scheme to the plurality of objective functions to generate the scan pattern. The method further comprises scanning the FOR according to the generated scan pattern.

Another example embodiment of these techniques is a lidar system including a light source configured to emit light pulses; a scanner configured to scan a field of regard (FOR) of the lidar system including direct the light pulses at different angles toward different points within the FOR; and a controller configured to drive the scanner to direct the light pulses across the field of regard, including: (i) obtain a plurality of objective functions, each of the objective functions specifying a cost for a respective property of the scan pattern, expressed in terms of one or more operational parameters of the scanner, (ii) apply an optimization scheme to the plurality of objective functions to generate the scan pattern, and (iii) scan the FOR according to the generated scan pattern.

DETAILED DESCRIPTION

Figure 1:
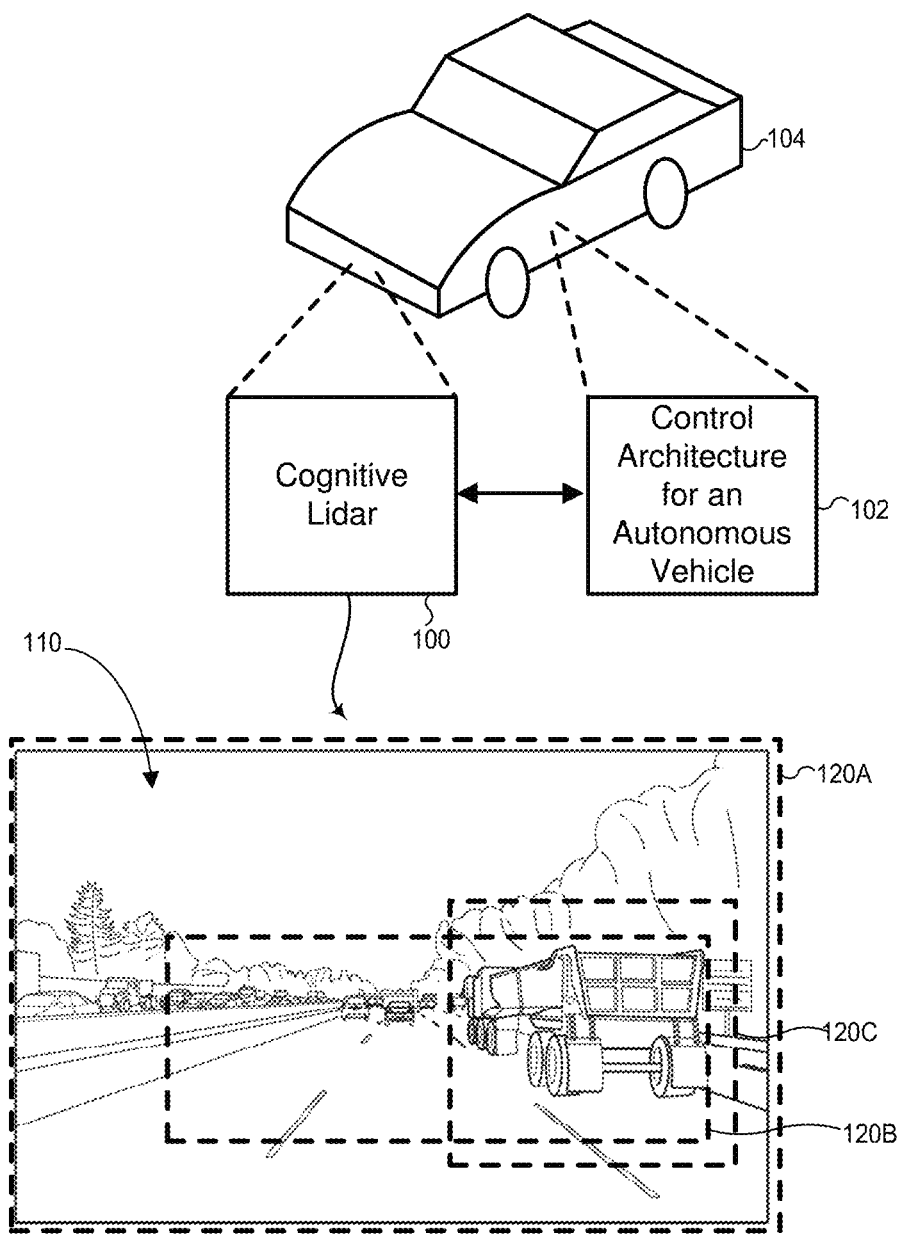
FIG. 1 is a block diagram of an example "cognitive" light detection and ranging (lidar) configured to optimize multiple objective functions to generate a pattern for scanning the environment in an autonomous vehicle.

Referring to FIG. 1, a lidar system 100 implements a multi-objective optimization scheme to determine a scan pattern for scanning a field of regard (FOR). The lidar system 100 in this example implementation operates in a self-driving or "autonomous" vehicle 104 and provides the results of scanning the FOR to a control architecture 102 of the autonomous vehicle 104, which applies the results of scanning the FOR according to the scan pattern to maneuver the autonomous vehicle 104. To scan an environment 110, the lidar system 100 can generate scan patterns in view of various objectives and constraints discussed below. The scan patterns can cover the maximum coverage area corresponding to the largest FOR which the scanner of the lidar system 100 supports, or the scan patterns can cover regions of interest such as region 120B approximately corresponding to road in front of the autonomous vehicle 104, or region 120C approximately corresponding to a proximate obstacle (in this case, a truck in the adjacent lane).

In general, the lidar system 100 can use multi-objective function methods to implement a model-based optimization of a coverage area and effective rescanning. However, the lidar system 100 cannot effectively utilize model-based techniques to also pursue higher-level goals of the autonomous vehicle 104, such as execution of autonomous path planning or minimizing near-misses. This is because in a typical autonomous stack which the control architecture 102 can implement, lidar output in the form of a point cloud for example is associated with a layer below the so-called perception layer at which the control architecture 102 detects objects, road boundaries, road markings, etc. In other words, a lidar merely provides sensor data to the perception layer which then interprets the sensor data. Path planning and vehicle control functions occur at even higher layers than the perception layer. It is difficult to provide critical objectives of the higher layers to the layer of the lidar via model-based optimization at least because explicit models do not exist and are in principle exceedingly difficult to construct.

To address this limitation, the lidar system 100 can implement a hierarchical architecture based on a model-free reinforcement learning (RL) framework, which leverages the learning methods of cognitive circuits in which higher level goals generate reward signals for the lower cognitive tasks. The lidar system 100 can achieve this for example by sending reward signals from the overall state of the autonomous vehicle 104, which can be referred to as the world state (WS), to condition the lower-level optimization. More specifically, the lidar system 100 can use the evaluation of world states to control the constraints of model-based optimization. The lidar system 100 thus can implement a cognitive architecture, and the lidar system 100 is referred to below as the "cognitive lidar" 100.

As discussed in more detail below, the cognitive lidar 100 can use reinforcement learning techniques to adjust optimization parameters in real time, based on feedback from the control architecture 102. The objectives to which the cognitive lidar 100 applies multi-objective optimization can include two or more of the following, expressed as functions: (i) a velocity objective function specifying the cost for velocity at which the scanner scans the FOR in the horizontal and/or vertical dimension; the system in general seeks to minimize the velocity of scanning because higher velocity can reduce resolution, (ii) an acceleration objective function specifying the cost of acceleration for the scanner, which can corresponds to power consumption; the system in general seeks to minimize the power consumption, (iii) a coverage objective function specifying the cost of coverage within the available FOR; the system in general seeks to maximize coverage to gather potentially useful information from a larger area; (iv) a rescan objective function specifying the cost for rescanning a certain region in view of the frequency of rescanning; the system in general seeks to maximize the rescan region; (v) a region-of-interest objective function specifying the cost for scanning a region of interest within the FOR in terms of resolution (as discussed above, scanning at a higher velocity can yield lower resolution); the system generally seeks to maximize the region of interest; and (vi) a dropped-line objective function specifying the cost for dropping a scan line, which can occur when the scanner changes the scan direction for example; the system generally seeks to minimize the number of dropped lines. The cognitive lidar 100 thus uses multi-objective optimization to generate a scan pattern than satisfies all of the objectives to the greatest extent available, subject to a set of constraints. The constraints can apply to velocity and acceleration, for example.

As indicated above, the vehicle 104 may be an autonomous vehicle. As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

Next, an example hardware architecture which the cognitive lidar 100 can utilize and an autonomous vehicle in which the cognitive lidar 100 can operate are discussed with reference to FIGS. 2-4B.

Although the examples below refer specifically to a lidar, the techniques of this disclosure in general can apply to any suitable system in which a sensor can scan a certain region. Such a sensor is configured to sense the environment of the autonomous vehicle by physically interacting with the environment in some way, such as transmitting and receiving laser light that reflects or scatters off of objects in the environment (e.g., if the sensor is a lidar device), transmitting and receiving radio or acoustic signals that reflect off of objects in the environment (e.g., if the sensor is a radar or sonar device), simply receiving light waves generated or reflected from different areas of the environment (e.g., if the sensor is a camera), and so on. In embodiments using more than one sensor, all of the sensors may be configured to sense portions of the environment, or one or more of the sensors may not physically interact with the external environment (e.g., if one of the sensors is an inertial measurement unit (IMU)). The sensors may all be of the same type, or may include a number of different sensor types (e.g., multiple lidar devices with different viewing perspectives, and/or a combination of lidar, camera, radar, and thermal imaging devices, etc.).

Figure 2:
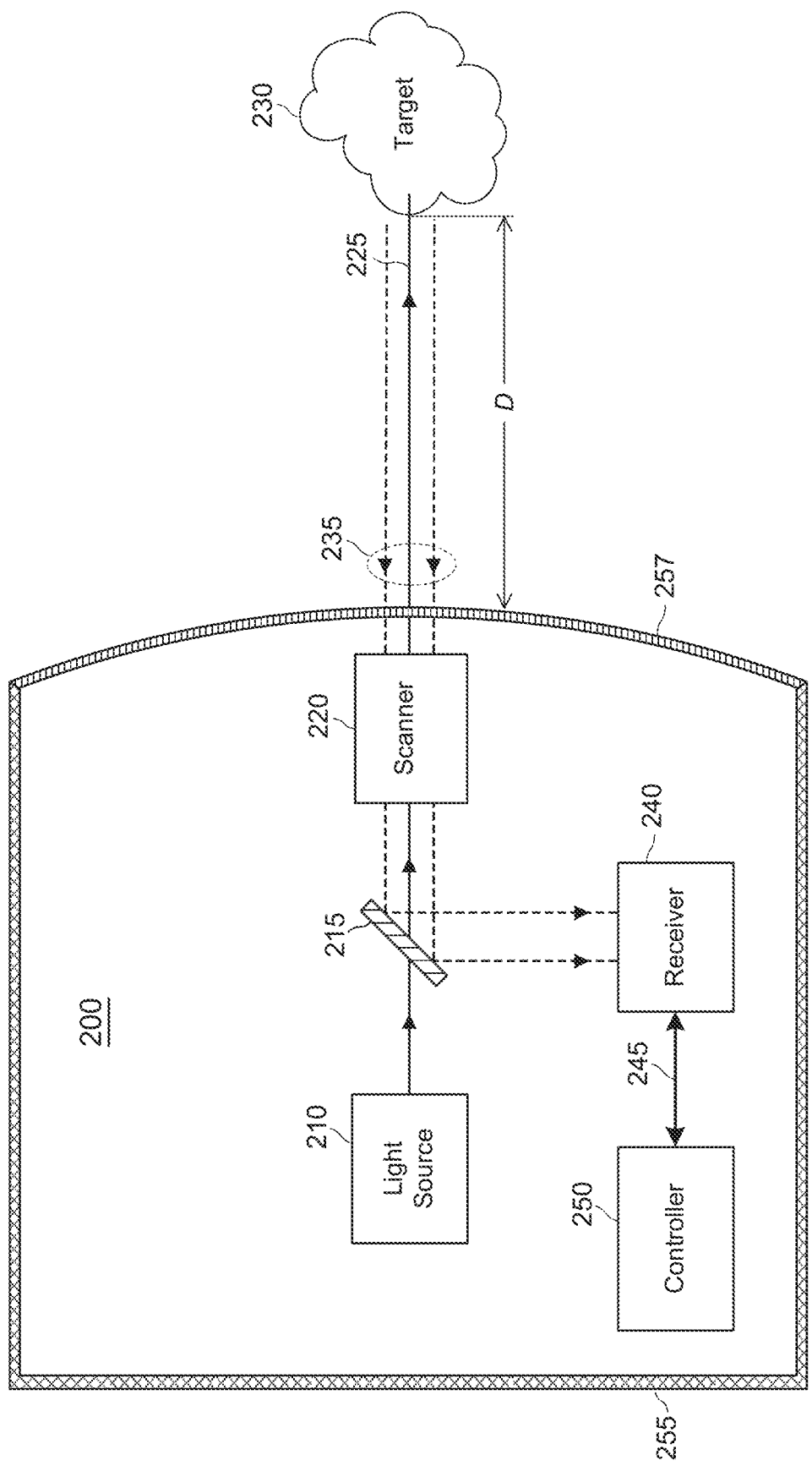
FIG. 2 is a block diagram of an example lidar that may be configured to operate according to the cognitive lidar logic of this disclosure.

Referring first to FIG. 2, the cognitive lidar 100 can be implemented for example as a lidar system 200 equipped with a light source 210, a mirror 215, a scanner 220, a receiver 240, and a controller 250. The light source 210 may be, for example, a laser (e.g., a laser diode) that emits light having a particular operating wavelength in the infrared, visible, or ultraviolet portions of the electromagnetic spectrum. In operation, the light source 210 emits an output beam of light 225 which may be continuous-wave, pulsed, or modulated in any suitable manner for a given application. The output beam of light 225 is directed downrange toward a remote target 230 located a distance D from the lidar system 200 and at least partially contained within a field of regard of the system 200.

Once the output beam 225 reaches the downrange target 230, the target 230 may scatter or, in some cases, reflect at least a portion of light from the output beam 225, and some of the scattered or reflected light may return toward the lidar system 200. In the example of FIG. 2, the scattered or reflected light is represented by input beam 235, which passes through the scanner 220, which may be referred to as a beam scanner, optical scanner, or laser scanner. The input beam 235 passes through the scanner 220 to the mirror 215, which may be referred to as an overlap mirror, superposition mirror, or beam-combiner mirror. The mirror 215 in turn directs the input beam 235 to the receiver 240.

The input beam 235 may include light from the output beam 225 that is scattered by the target 230, light from the output beam 225 that is reflected by the target 230, or a combination of scattered and reflected light from target 230. According to some implementations, the lidar system 200 can include an "eye-safe" laser that present little or no possibility of causing damage to a person's eyes. The input beam 235 may contain only a relatively small fraction of the light from the output beam 225.

The receiver 240 may receive or detect photons from the input beam 235 and generate one or more representative signals. For example, the receiver 240 may generate an output electrical signal 245 that is representative of the input beam 235. The receiver may send the electrical signal 245 to the controller 250. Depending on the implementation, the controller 250 may include one or more instruction-executing processors, an application-specific integrated circuit (ASIC), a field-programmable gate array (FPGA), and/or other suitable circuitry configured to analyze one or more characteristics of the electrical signal 245 in order to determine one or more characteristics of the target 230, such as its distance downrange from the lidar system 200. More particularly, the controller 250 may analyze the time of flight or phase modulation for the beam of light 225 transmitted by the light source 210. If the lidar system 200 measures a time of flight of T (e.g., T representing a round-trip time of flight for an emitted pulse of light to travel from the lidar system 200 to the target 230 and back to the lidar system 200), then the distance D from the target 230 to the lidar system 200 may be expressed as $D=c \cdot T/2$, where c is the speed of light (approximately $3.0 \times 10^8$ m/s).

The distance D from the lidar system 200 is less than or equal to a maximum range $R_{MAX}$ of the lidar system 200. The maximum range $R_{MAX}$ (which also may be referred to as a maximum distance) of a lidar system 200 may correspond to the maximum distance over which the lidar system 200 is configured to sense or identify targets that appear in a field of regard of the lidar system 200. The maximum range of lidar system 200 may be any suitable distance, such as 50 m, 200 m, 500 m, or 1 km, for example.

In some implementations, the light source 210, the scanner 220, and the receiver 240 may be packaged together within a single housing 255, which may be a box, case, or enclosure that holds or contains all or part of the lidar system 200. The housing 255 includes a window 257 through which the beams 225 and 235 pass. The controller 250 may reside within the same housing 255 as the components 210, 220, and 240, or the controller 250 may reside outside of the housing 255. In one embodiment, for example, the controller 250 may instead reside within, or partially within, the perception component 102 of the lane marking detection and tracking architecture 100 shown in FIG. 1. In some implementations, the housing 255 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 2, the output beam 225 and input beam 235 may be substantially coaxial. In other words, the output beam 225 and input beam 235 may at least partially overlap or share a common propagation axis, so that the input beam 235 and the output beam 225 travel along substantially the same optical path (albeit in opposite directions). As the lidar system 200 scans the output beam 225 across a field of regard, the input beam 235 may follow along with the output beam 225, so that the coaxial relationship between the two beams is maintained.

Generally speaking, the scanner 220 steers the output beam 225 in one or more directions downrange. To accomplish this, the scanner 220 may include one or more scanning mirrors and one or more actuators driving the mirrors to rotate, tilt, pivot, or move the mirrors in an angular manner about one or more axes, for example. While FIG. 2 depicts only a single mirror 215, the lidar system 200 may include any suitable number of flat or curved mirrors (e.g., concave, convex, or parabolic mirrors) to steer or focus the output beam 225 or the input beam 235. For example, the first mirror of the scanner may scan the output beam 225 along a first direction, and the second mirror may scan the output beam 225 along a second direction that is substantially orthogonal to the first direction.

A "field of regard" of the lidar system 200 may refer to an area, region, or angular range over which the lidar system 200 may be configured to scan or capture distance information. When the lidar system 200 scans the output beam 225 within a 30-degree scanning range, for example, the lidar system 200 may be referred to as having a 30-degree angular field of regard. The scanner 220 may be configured to scan the output beam 225 horizontally and vertically, and the field of regard of the lidar system 200 may have a particular angular width along the horizontal direction and another particular angular width along the vertical direction. For example, the lidar system 200 may have a horizontal field of regard of 10° to 120° and a vertical field of regard of 2° to 45°.

The one or more scanning mirrors of the scanner 220 may be communicatively coupled to the controller 250, which may control the scanning mirror(s) so as to guide the output beam 225 in a desired direction downrange or along a desired scan pattern. In general, a scan (or scan line) pattern may refer to a pattern or path along which the output beam 225 is directed. The lidar system 200 can use the scan pattern to generate a point cloud with points or "pixels" that substantially cover the field of regard. The pixels may be approximately evenly distributed across the field of regard, or distributed according to a particular non-uniform distribution.

In operation, the light source 210 may emit pulses of light which the scanner 220 scans across a field of regard of the lidar system 200. The target 230 may scatter one or more of the emitted pulses, and the receiver 240 may detect at least a portion of the pulses of light scattered by the target 230. The receiver 240 may receive or detect at least a portion of the input beam 235 and produce an electrical signal that corresponds to the input beam 235. The controller 250 may be electrically coupled or otherwise communicatively coupled to one or more of the light source 210, the scanner 220, and the receiver 240. The controller 250 may provide instructions, a control signal, or a trigger signal to the light source 210 indicating when the light source 210 should produce optical pulses, and possibly characteristics (e.g., duration, period, peak power, wavelength, etc.) of the pulses. The controller 250 may also determine a time-of-flight value for an optical pulse based on timing information associated with when the pulse was emitted by light source 210 and when a portion of the pulse (e.g., the input beam 235) was detected or received by the receiver 240.

As indicated above, the lidar system 200 may be used to determine the distance to one or more downrange targets 230. By scanning the lidar system 200 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 200 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 200 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 200 can overlap, encompass, or enclose at least a portion of the target 230, which may include all or part of an object that is moving or stationary relative to lidar system 200. For example, the target 230 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 3:
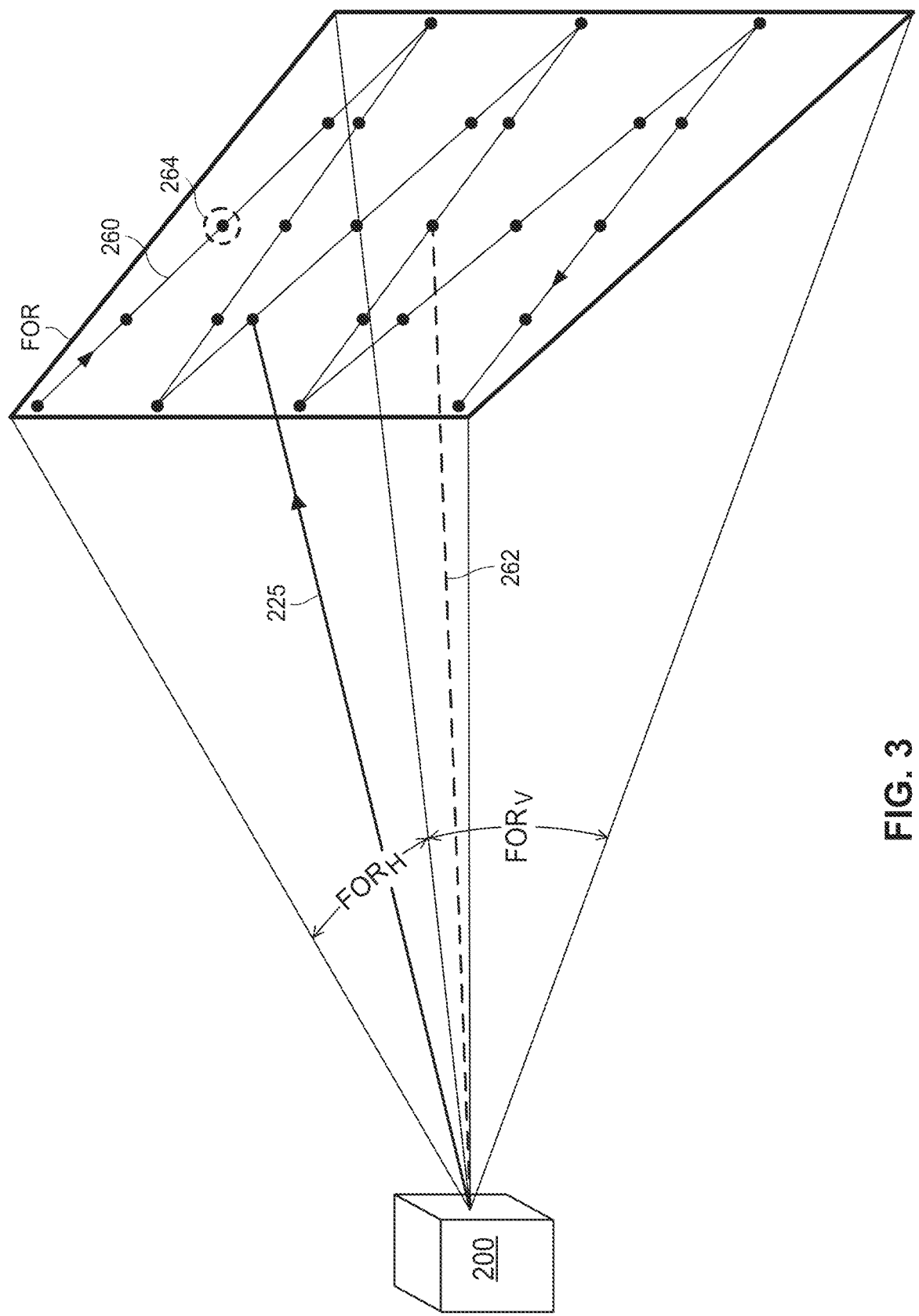
FIG. 3 illustrates an example scan pattern which the lidar system of FIG. 2 may produce when identifying targets within a field of regard.

FIG. 3 illustrates an example scan pattern 260 which the lidar system 200 of FIG. 2 may produce. In particular, the lidar system 200 may be configured to scan the output optical beam 225 along the scan pattern 260. In some implementations, the scan pattern 260 corresponds to a scan across any suitable field of regard having any suitable horizontal field of regard ($FOR_H$) and any suitable vertical field of regard ($FOR_V$). For example, a certain scan pattern may have a field of regard represented by angular dimensions (e.g., $FOR_H \times FOR_V$) 40°×30°, 90°×40°, or 60°×15°. While FIG. 3 depicts a "zig-zag" pattern 260, other implementations may instead employ other patterns (e.g., parallel, horizontal scan lines), and/or other patterns may be employed in specific circumstances.

In the example implementation and/or scenario of FIG. 3, reference line 262 represents a center of the field of regard of scan pattern 260. In FIG. 3, if the scan pattern 260 has a 60°×15° field of regard, then the scan pattern 260 covers a ±30° horizontal range with respect to reference line 262 and a ±7.5° vertical range with respect to reference line 262. An azimuth (which may be referred to as an azimuth angle) may represent a horizontal angle with respect to the reference line 262, and an altitude (which may be referred to as an altitude angle, elevation, or elevation angle) may represent a vertical angle with respect to the reference line 262.

The scan pattern 260 may include multiple points or pixels 264, and each pixel 264 may be associated with one or more laser pulses and one or more corresponding distance measurements. A cycle of scan pattern 260 may include a total of $P_x \times P_y$ pixels 264 (e.g., a two-dimensional distribution of $P_x$ by $P_y$ pixels). The number of pixels 264 along a horizontal direction may be referred to as a horizontal resolution of the scan pattern 260, and the number of pixels 264 along a vertical direction may be referred to as a vertical resolution of the scan pattern 260.

Each pixel 264 may be associated with a distance/depth (e.g., a distance to a portion of a target 230 from which the corresponding laser pulse was scattered) and one or more angular values. As an example, the pixel 264 may be associated with a distance value and two angular values (e.g., an azimuth and altitude) that represent the angular location of the pixel 264 with respect to the lidar system 200. A distance to a portion of the target 230 may be determined based at least in part on a time-of-flight measurement for a corresponding pulse. More generally, each point or pixel 264 may be associated with one or more parameter values in addition to its two angular values. For example, each point or pixel 264 may be associated with a depth (distance) value, an intensity value as measured from the received light pulse, and/or one or more other parameter values, in addition to the angular values of that point or pixel.

An angular value (e.g., an azimuth or altitude) may correspond to an angle (e.g., relative to reference line 262) of the output beam 225 (e.g., when a corresponding pulse is emitted from lidar system 200) or an angle of the input beam 235 (e.g., when an input signal is received by lidar system 200). In some implementations, the lidar system 200 determines an angular value based at least in part on a position of a component of the scanner 220. For example, an azimuth or altitude value associated with the pixel 264 may be determined from an angular position of one or more corresponding scanning mirrors of the scanner 220. The zero elevation, zero azimuth direction corresponding to the reference line 262 may be referred to as a neutral look direction (or neutral direction of regard) of the lidar system 200.

Figure 4A:
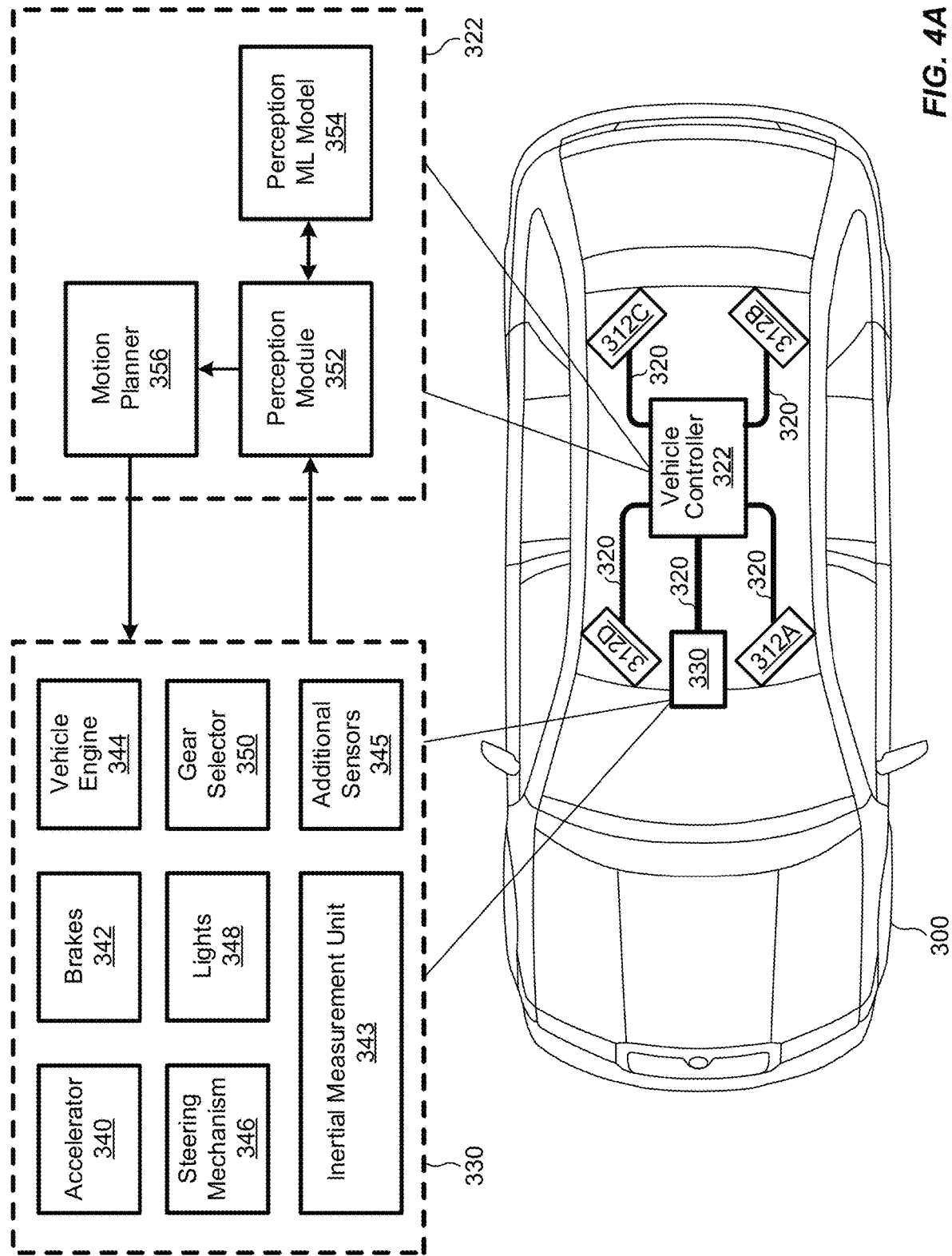
FIG. 4A illustrates an example vehicle in which the lidar system of FIG. 2 may operate.

FIG. 4A illustrates an example vehicle 300 with a lidar system 302. The lidar system 302 includes multiple sensor heads 312A-312D, each of which is equipped with a respective laser. Alternatively, the sensor heads 312A-D can be coupled to a single laser via suitable laser-sensor links. In general, each of the sensor heads 312 may include some or all of the components of the lidar system 200 illustrated in FIG. 2.

The sensor heads 312 in FIG. 4A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 312 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 4A, four sensor heads 312 are positioned at or near the four corners of the vehicle (e.g., each of the sensor heads 312 may be incorporated into a light assembly, side panel, bumper, or fender), and the laser 310 may be located within the vehicle 300 (e.g., in or near the trunk). The four sensor heads 312 may each provide a 90° to 120° horizontal field of regard (FOR), and the four sensor heads 312 may be oriented so that together they provide a complete 360-degree view around the vehicle. As another example, the lidar system 302 may include six sensor heads 312 positioned on or around the vehicle 300, where each of the sensor heads 312 provides a 60° to 90° horizontal FOR. As another example, the lidar system 302 may include eight sensor heads 312, and each of the sensor heads 312 may provide a 45° to 60° horizontal FOR. As yet another example, the lidar system 302 may include six sensor heads 312, where each of the sensor heads 312 provides a 70° horizontal FOR with an overlap between adjacent FORs of approximately 10°. As another example, the lidar system 302 may include two sensor heads 312 which together provide a forward-facing horizontal FOR of greater than or equal to 30°.

Data from each of the sensor heads 312 may be combined or stitched together to generate a point cloud that covers a greater than or equal to 30-degree horizontal view around a vehicle. For example, the laser 310 may include a controller or processor that receives data from each of the sensor heads 312 (e.g., via a corresponding electrical link 320) and processes the received data to construct a point cloud covering a 360-degree horizontal view around a vehicle or to determine distances to one or more targets. The point cloud or information from the point cloud may be provided to a vehicle controller 322 via a corresponding electrical, optical, or radio link 320. The vehicle controller 322 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 312 at a controller included within the laser 310, and is provided to the vehicle controller 322. In other implementations, each of the sensor heads 312 includes a controller or processor that constructs a point cloud for a portion of the 360-degree horizontal view around the vehicle and provides the respective point cloud to the vehicle controller 322. The vehicle controller 322 then combines or stitches together the points clouds from the respective sensor heads 312 to construct a combined point cloud covering a 360-degree horizontal view. Still further, the vehicle controller 322 in some implementations communicates with a remote server to process point cloud data.

In any event, the vehicle 300 may be an autonomous vehicle where the vehicle controller 322 provides control signals to various components 330 within the vehicle 350 to maneuver and otherwise control operation of the vehicle 350. The components 330 are depicted in an expanded view in FIG. 4A for ease of illustration only. The components 330 may include an accelerator 340, brakes 342, a vehicle engine 344, a steering mechanism 346, lights 348 such as brake lights, head lights, reverse lights, emergency lights, etc., a gear selector 350, an IMU 343, additional sensors 345 (e.g., cameras, radars, acoustic sensors, atmospheric pressure sensors, moisture sensors, ambient light sensors, as indicated below) and/or other suitable components that effectuate and control movement of the vehicle 300. The gear selector 350 may include the park, reverse, neutral, drive gears, etc. Each of the components 330 may include an interface via which the component receives commands from the vehicle controller 322 such as "increase speed," "decrease speed," "turn left 5 degrees," "activate left turn signal," etc. and, in some cases, provides feedback to the vehicle controller 322.

The vehicle controller 322 can include a perception module 352 that receives input from the components 300 and uses a perception machine learning (ML) model 354 to provide indications of detected objects, road markings, etc. to a motion planner 356, which generates commands for the components 330 to maneuver the vehicle 300. Referring back to FIG. 1, the components 352-356 in one embodiment implement the components 102-107, in any suitable configuration.

In some implementations, the vehicle controller 322 receives point cloud data from the sensor heads 312 via the links 320 and analyzes the received point cloud data, using any one or more of the aggregate or individual SDCAs disclosed herein, to sense or identify targets 230 (see FIG. 2) and their respective locations, distances, speeds, shapes, sizes, type of target (e.g., vehicle, human, tree, animal), etc. The vehicle controller 322 then provides control signals via another link 320 to the components 330 to control operation of the vehicle based on the analyzed information.

In addition to the lidar system 302, the vehicle 300 may also be equipped with other sensors 345 such as a camera, a thermal imager, a conventional radar (none illustrated to avoid clutter), etc. The sensors can provide additional data to the vehicle controller 322 via wired or wireless communication links. Further, the vehicle 300 in an example implementation includes a microphone array operating as a part of an acoustic source localization system configured to determine sources of sounds.

Figure 4B:
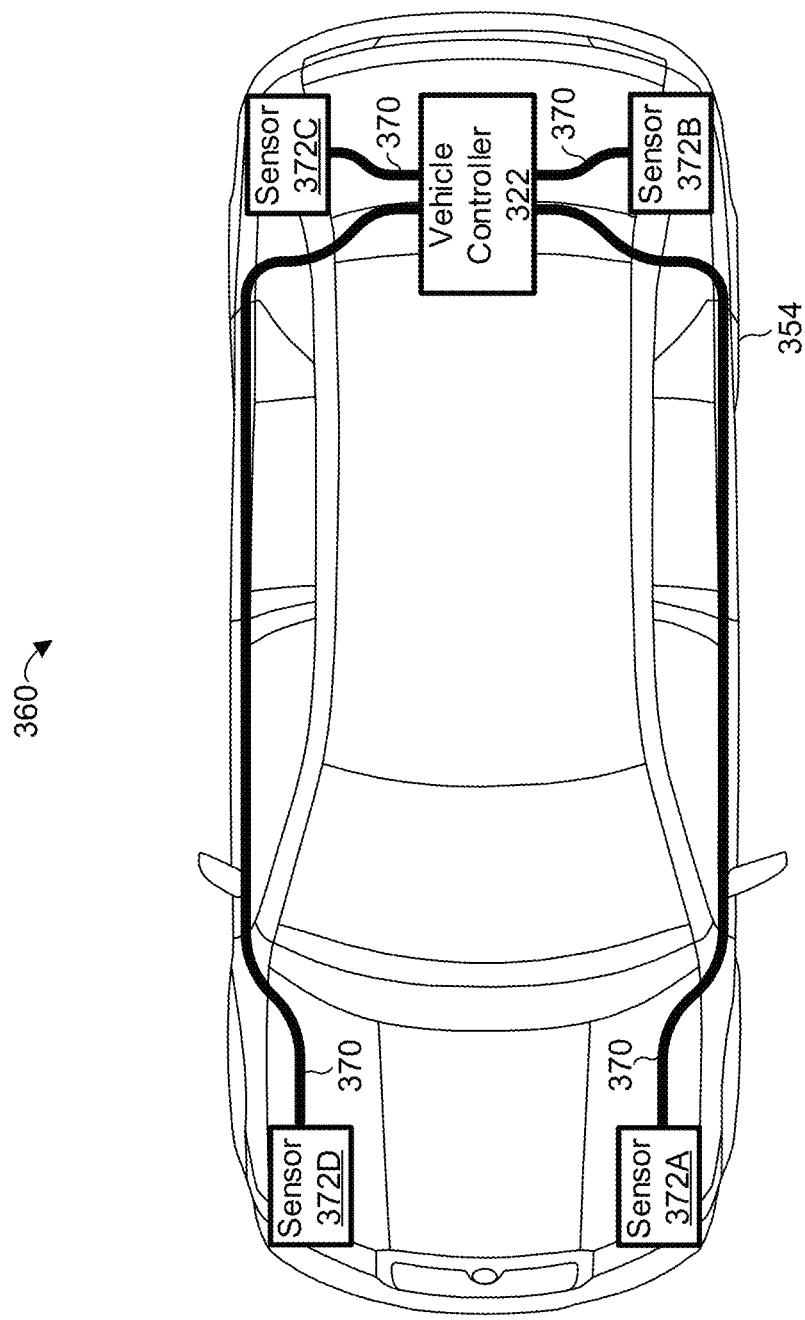
FIG. 4B illustrates another example vehicle in which the lidar system of FIG. 2 may operate.

As another example, FIG. 4B illustrates a vehicle 360 in which several sensor heads 372, each of which may be similar to one of the sensor heads 312 of FIG. 4A, are disposed at the front of the hood and on the trunk. In particular, the sensor heads 372B and C are oriented to face backward relative to the orientation of the vehicle 360, and the sensor heads 372A and D are oriented to face forward relative to the orientation of the vehicle 360. In another implementation, additional sensors are disposed at the side view mirrors, for example.

Figure 5:
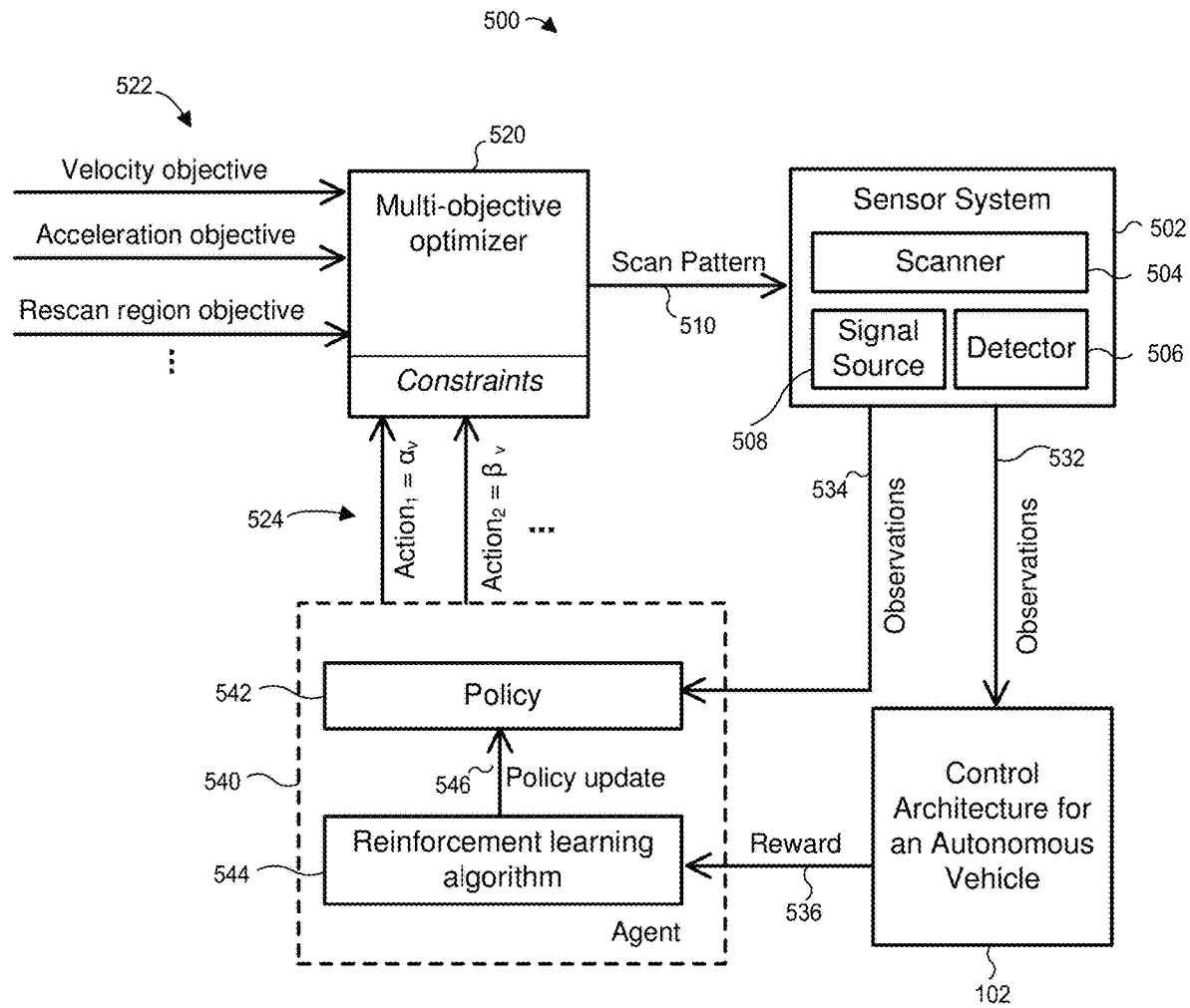
FIG. 5 illustrates an example software architecture of a cognitive lidar that implements multi-objective optimization to generate a scan pattern.

Now referring to FIG. 5, the cognitive lidar 100 can be implemented according to an example architecture 500. According to this architecture, a sensor system 502 including a scanner 504 (e.g., the scanner 220 of FIG. 2), a signal source 508 (e.g., the light source 210 of FIG. 2), and a detector 506 (e.g., the receiver 240 of FIG. 2) receives a scan pattern 510 from a multi-objective optimizer 520 that interacts with an agent 540 (both implemented in the controller 250 of FIG. 2, for example).

The multi-objective optimizer 520 receives objectives 522 such as a velocity objective, an acceleration objective, a rescan region objective, etc. The multi-objective optimizer 520 also receives constraints 524 on certain actions from the agent 540, which implements RL techniques in view of evolving world states. The constraints 524 can include for example a velocity constraint that specifies a maximum velocity at which the scanner is capable of scanning the FOR and/or an acceleration constraint that specifies a maximum acceleration with which the scanner is capable of scanning the FOR. More particularly, the agent 540 updates a policy 542 by generating, using an RL algorithm 544, policy updates 546. The policy 542 receives observations 534 from the sensor system 502 (e.g., indications of detected objects). The observations 534 describe the world state as the sensor system 502 "sees" the world in accordance with the previously received scan pattern 510.

The multi-objective optimizer 520 in some implementations uses a suitable gradient-free optimization technique to more efficiently find local minima for the multi-dimensional problem the cognitive lidar 100 seeks to solve.

The RL algorithm 544 receives "rewards" 536 from the control architecture 102. An award can be, for example, an indication that the vehicle is properly staying in its lane, that the vehicle successfully completed a maneuver, etc. The agent 540 thus generates actions in the form of boundaries 524 (constraints) for optimization, and the multi-objective optimizer 520 then performs multi-objective optimization to generate a new iteration of the scan pattern 510. Depending on the implementation, the constraints 524 specify both a lower and upper boundary for a certain variable, or only one of the lower and the upper boundary.

Figure 6:
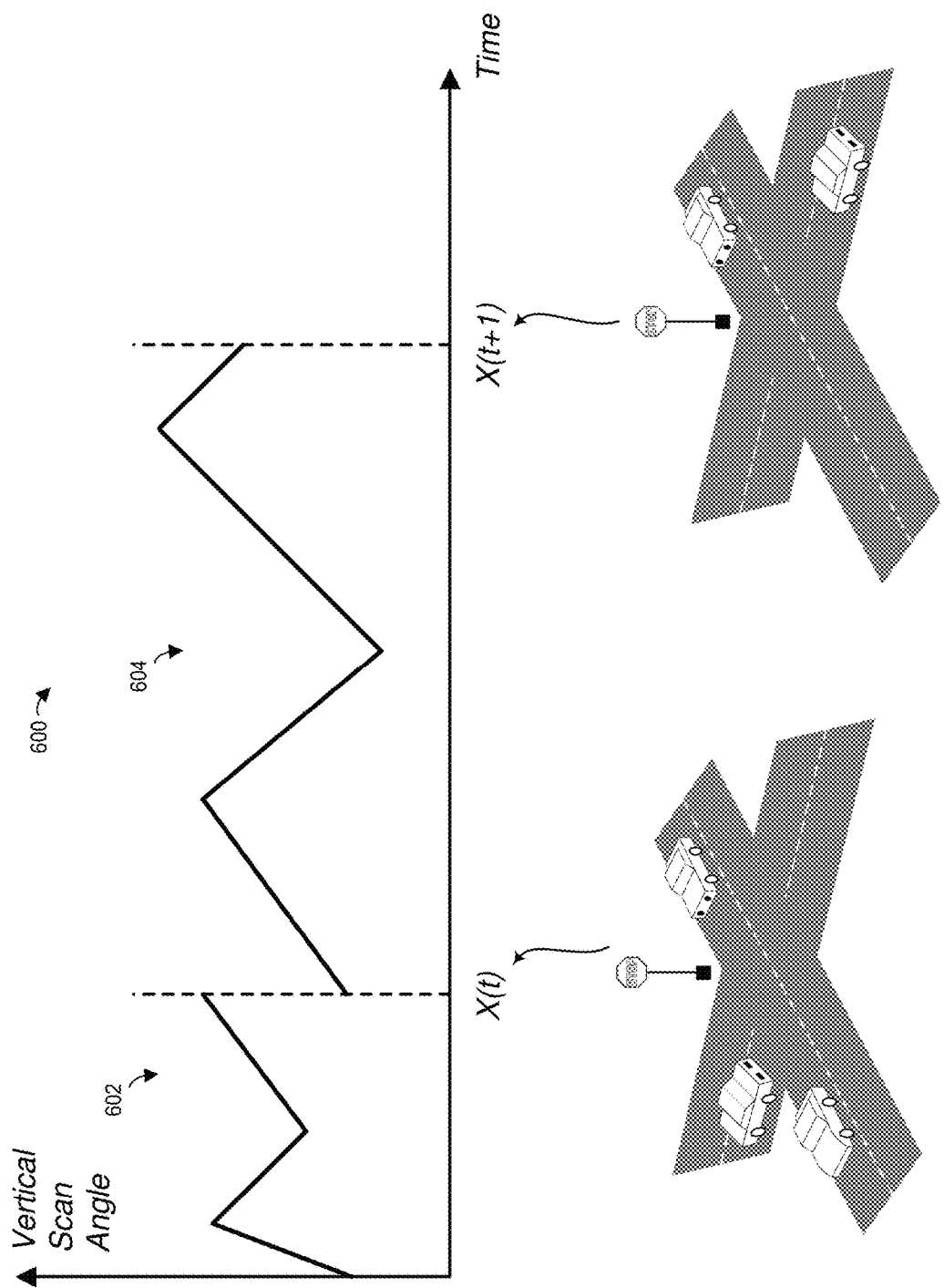
FIG. 6 illustrates a change in vertical scan angle as a function of time, and the corresponding world states at the beginning of a scan frame and the end of the scan frame, in an example scenario.

More particularly, and with reference to FIG. 6, the cognitive lidar 100 at the beginning of a scan can determine the world state x(t), which can correspond to the results of processing the region of interest based on the frame the system generated by scanning the environment according to the previous iteration of the scan pattern 602. As illustrated in FIG. 6, the scan pattern 602 can include multiple scan segments, each with a respective velocity and length. The processing can include object detection for example and, in some cases, influence of higher level objectives such as effective prediction and path planning. The world state at time t also can correspond to information state 1($t$) that aggregates past information about the world.

The policy module 542 depicted in FIG. 5 can implement RL policy $\Pi_{RL}$ which generates upper and lower boundaries for a variable such as the velocity or acceleration, so that $\Pi_{RL}(x(t))=(\alpha_v, \beta_v), (\alpha_a, \beta_a)$, etc. The agent 540 then provides the boundaries or constraints 524 to the multi-objective optimizer 520, which in turn applies the multi-objective optimization as discussed above subject to the velocity constraints $\alpha_v$ and $\beta_v$, acceleration constrains $\alpha_a, \beta_a$, etc. to generate a new scan pattern 604. The multi-objective optimizer 520 provides this new pattern to the sensor system 602 (signal 510 in FIG. 5), which can scan the environment according to the new pattern 604 and generate an evolved world state x(t+1).

When calculating the reward R(x(t), x(t+1)) based on the evolution of the world state at time t to the world state at time t+1 during training, the cognitive lidar 100 can use any suitable set of objectives associated with the usage of the sensor system 502. When the cognitive lidar 100 operates in an autonomous vehicle, the reward can correspond to a more immediate result of applying the scan pattern (e.g., a metric of quality of object detection or object tracking) or a less immediate result (e.g., collision avoidance by a motion planning component of the control architecture).

As discussed below with reference to FIG. 8, to produce the RL policy 542 during training, the cognitive lidar 100 implemented according to the architecture 500 can assesses the evolution of world states as a result of scanning the environment according to a particular scan pattern and, based on the assessed evolution, computes either a positive or negative reward for reinforcement of the strategy that produced a change in the scan pattern.

Several example objectives 522 are considered next with reference to FIG. 5 as well as FIGS. 7A-7D.

Referring first to the velocity objective function, the velocity at which the scanner 504 scans the FOR effects resolution. For example, the scanner 504 moving faster through a region within the FOR results in fewer data points of that area, thereby reducing resolution. To this end, it is desirable have a well-designed trade-off between the velocity of scanning and resolution. The following example velocity objective function intends to minimize the speed of scanning by formulating the equation as an energy function:

velocity cost=(slope of scanning segment)$^2$*length of scanning segment  (Eq. 1)

Thus, the velocity objective function generates a higher cost for higher velocity of scanning, and in can calculate the cost of velocity based on a slope of a scanning segment and a length of the scanning segment, where the slope corresponds to displacement along the scan dimension (e.g., horizontal, vertical) over time.

Figure 7A:
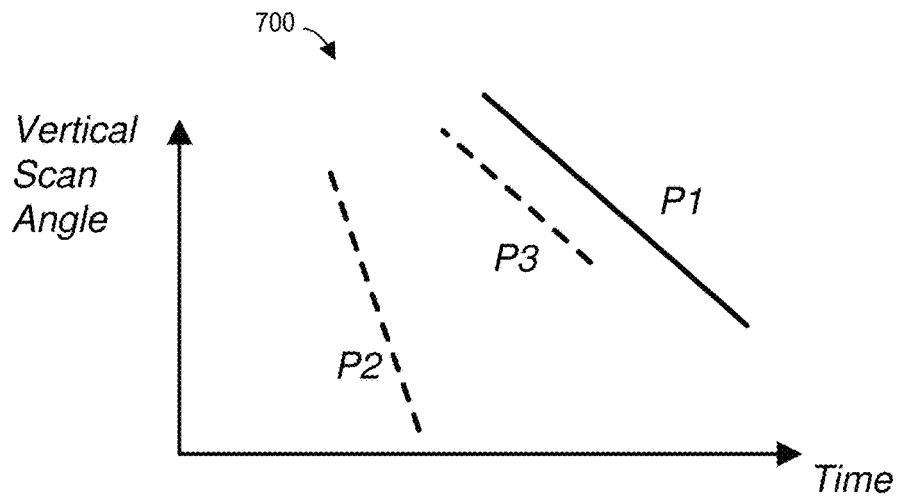
FIG. 7A illustrates example selection of a portion of a scan pattern in view of the velocity objective.

For clarity, a diagram 700 of FIG. 7A illustrates how the multi-objective optimizer 520 selects a portion of a scan pattern, from among candidate patterns P1-P3, in view of the velocity objective. In this example, the multi-objective optimizer 520 uses the objective function to choose pattern P1 as optimal because pattern P2 is too steep and, although pattern P3 has the same slope as pattern P1, the duration of the scan associated with pattern P3 is less than the duration of the scan associated with pattern P1 (i.e., the length of the scanning segment of pattern P3 is too short relative to pattern P1).

Referring next to the acceleration objective function, in some cases it is beneficial for account for power consumption of the scanner 504, particularly when the scanner 504 is a mechanical system. For some of these implementations, the scanner 504 consumes a large amount of power when the motor driving a mirror frequently changes speeds (e.g., when the mirror scans the vertical dimension of the FOR by pivoting up and down). Formally, the power such a scanner draws is a function of the rate of change of scanning speeds. Thus, an optimal scan pattern minimizes the power drawn by minimizing the rate of change of speeds. The multi-objective optimizer 520 thus can utilize the following acceleration objective function:

acceleration cost=|slope of segment 1−slope of segment 2|  (Eq.2)

The acceleration objective function thus generates higher cost for higher acceleration of the scanner, and can calculate the cost of acceleration based on a difference between slopes of two scanning segments with a shared endpoint, where the slope of each scanning segment corresponding to a respective displacement along the scan dimension (e.g., horizontal, vertical) divided by time.

Figure 7B:
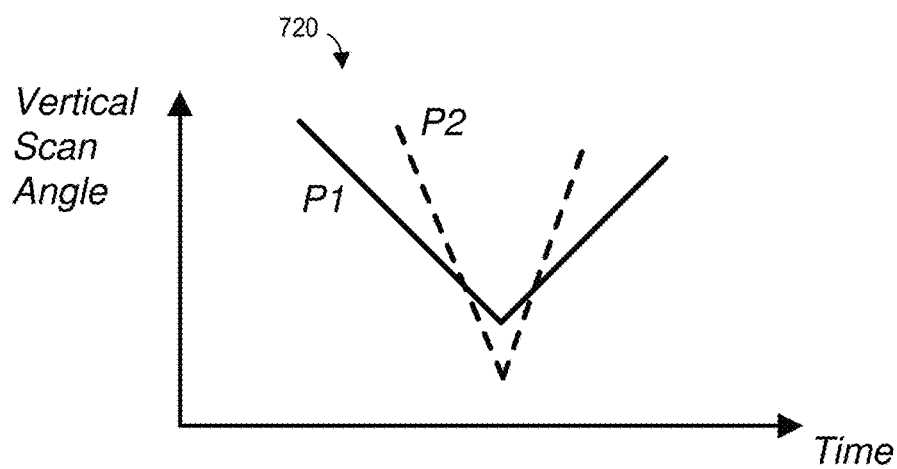
FIG. 7B illustrates example selection of a portion of a scan pattern in view of the acceleration objective.

Referring for clarity to a diagram 720 for FIG. 7B, each of the example patterns P1 and P2 includes two line segments with a common endpoint. Each of these patterns illustrates a transition in scan direction. The multi-objective optimizer 520 can select pattern P1 rather than pattern P2 because the rate the velocity of scanning changes is lower in pattern P1 compared to pattern P2. In other words, the velocity of scanning changes less rapidly in accordance with pattern P1, and thus the acceleration cost function of Eq. 2 yields a smaller cost for pattern P1 relative to pattern P2.

Now referring to the coverage objective function, an effective scan pattern allows the scanner 504 to sweep sufficient portion of the maximum FOR (see FIG. 1) to yield a scanned frame useful for higher layers such as perception, prediction, etc. To optimize the coverage cost, the multi-objective optimizer 520 in some implementations implements the following equation:

$$\text{coverage cost} = |\text{GIVEN FOR} - (\text{max vertical scan angle} - \text{min vertical scan angle})_{scan\ pattern}| \quad \text{(Eq. 3)}$$

Figure 7C:
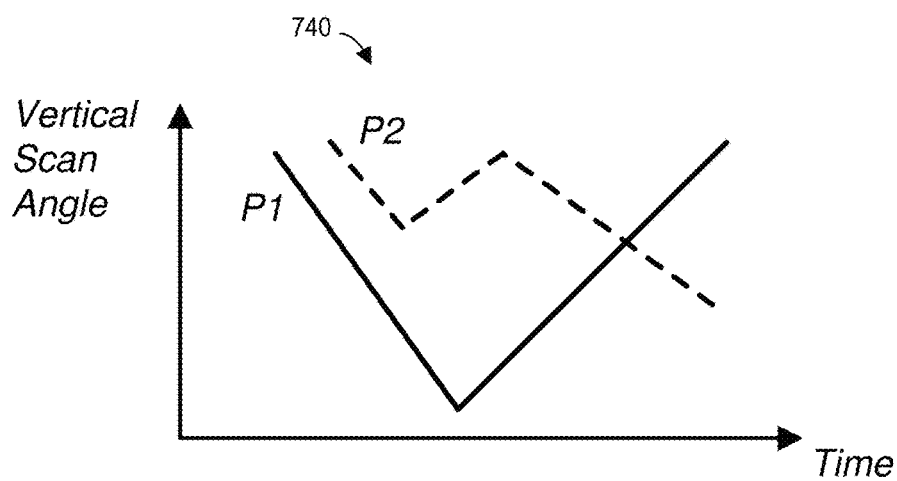
FIG. 7C illustrates example selection of a portion of a scan pattern in view of the coverage objective.

By way of example, FIG. 7C illustrates an diagram 740 of scan patterns P1 and P2 from which the multi-objective optimizer 520 can select the more desirable scan pattern based on Eq. 3. Here, scan pattern P1 covers a larger FOR than scan pattern P2 because scan pattern P1 corresponds to a larger difference between the smallest and largest vertical scan angle. As a result, the coverage objective function generates a lower cost for scan pattern P1, according to Eq. 3.

In general, the coverage objective function generates lower cost for higher coverage, and can calculate the cost of coverage based on a difference between a given coverage and a maximum coverage available to the scanner.

A rescan region objective function is briefly considered next. Rescan regions allow for example the multi-objective optimizer 520 to perform velocity estimation at the frame level (by providing multiple sensor readings for the same object or same portion of an object within a single frame). Rescanning the road or sky is generally not useful because in most situations, there is no need to calculate velocity for either the road or sky. Also, the frequency of rescanning effects the rescan objective function: if the rescan happens within a very short time interval, performance of the velocity estimation algorithm may deteriorate because the system cannot distinguish between noise in the point cloud and motion of an object. Given these two factors, the rescan region objective seeks to maximize the rescan regions within a certain area while maintaining a time gap above a predetermined threshold.

Figure 7D:
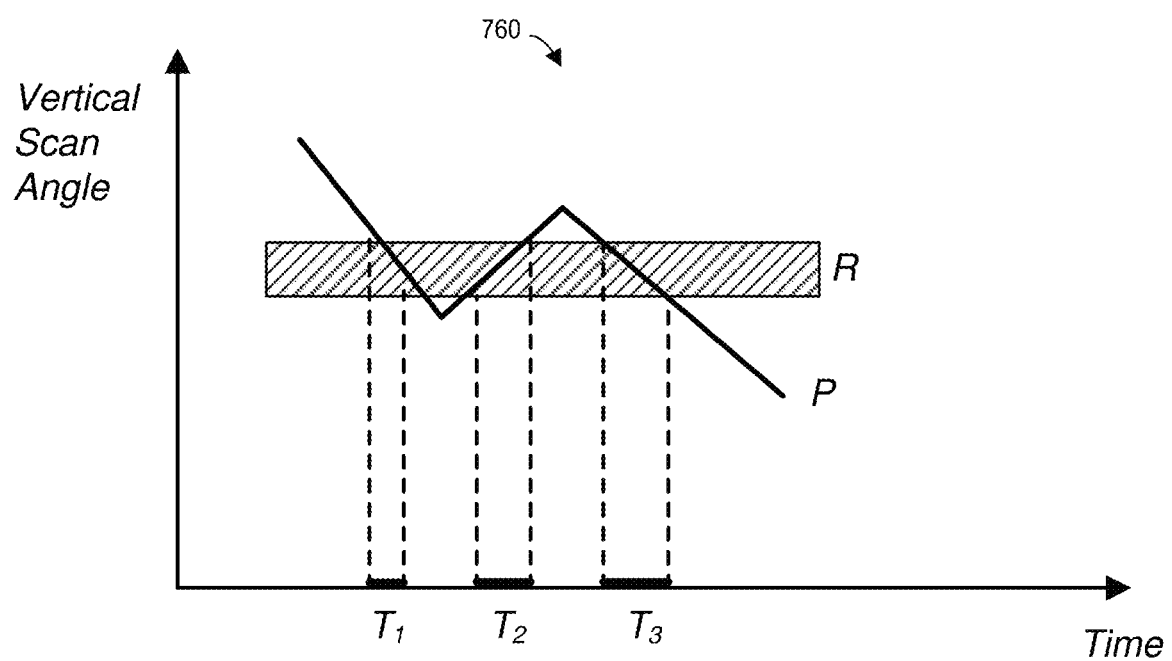
FIG. 7D illustrates example selection of a portion of a scan pattern in view of the rescan objective.

A diagram 760 of FIG. 7D illustrates an example scan pattern P that can yield a rescan region R of a certain size. In the example of FIG. 7D, there are three pairs of valid overlap regions: an overlap region corresponding to intervals $T_1$ & $T_2$, an overlap region corresponding to intervals $T_1$ & $T_3$, and an overlap region corresponding to intervals $T_2$ & $T_3$. The multi-objective optimizer 520 may determine that there is an insufficient time gap between the end of interval $T_1$ and the beginning of interval $T_2$, and an insufficient gap between the end of interval $T_2$ and the beginning of interval $T_3$. More particularly, the multi-objective optimizer 520 can determine that these gaps do not exceed a predetermined threshold value. In any case, the rescan region objective function can calculate the cost of the rescan region by generating a higher cost value for larger rescan regions R (thus, the cost value is inversely proportional to the size of the rescan region) and either restrict the allowable dimensions of the rescan region R based on the minimum time gaps between the overlap regions, or further adjust the cost value based on these gaps (e.g., by increasing the cost as the gaps become smaller).

Further, the multi-objective optimizer 520 can use a region-of-interest objective function. Within an FOR, typically there are areas with more valuable information (e.g., areas with pedestrians and vehicles), and areas with less valuable information (e.g., areas with trees and roads). The multi-objective optimizer 520 can attempt to more densely scan the areas with more valuable information, which typically are referred to regions of interest. To do so, the scanner 504 can apply the feedback from the perception system and attempt to focus on the regions the perception system identifies as being more important. For example, referring back to FIG. 1, the perception system can specify to the multi-objective optimizer that region 120C is a region of interest. The multi-objective optimizer 520 can incorporate the region 120C into the region-of-interest objective function by calculating the total amount of time the scanner 504 spends on the region 120C relative to the maximum FOR 120A. The region-of-interest objective function also can raise the priority of this region of interest by multiplying the time spent in the region 120C by a certain factor F to prioritize the region 120C over other regions within the maximum FOR 120A. Referring again to FIG. 7D, the region R also can be a region of interest which a perception module selects. In this example, the time intervals $T_1$, $T_2$, and $T_3$ denote the time spent scanning the region of interest.

The region-of-interest objective function can generate a lower cost for a larger region-of-interest region, and a higher cost for a smaller region-of-interest region. More generally, the region-of-interest objective function can calculate the cost of scanning the region-of-interest based on a size of the region of interest relative to an overall size of the FOR.

Still further, the multi-objective optimizer 520 can support a dropped-line objective function. Because a scanning system, such as the sensor system 502, can drop a line when the scanner has to change the speed (to begin scanning in the opposite direction), the scanning system can experience a drop in useful resolution. The multi-objective optimizer 520 can use a dropped-line objective function to minimize a drop in data. For example, the multi-objective optimizer 520 can incorporate a look-up table that specifies the relationship between motor acceleration and the number of dropped scan lines (which can be based on empirical data, for example).

The drop-line function generates higher cost for a larger number of dropped scan lines, and can calculate the cost of dropping the scan line based on an empirically determined relationship between acceleration of the scanner and a number of dropped scan lines.

Figure 9:
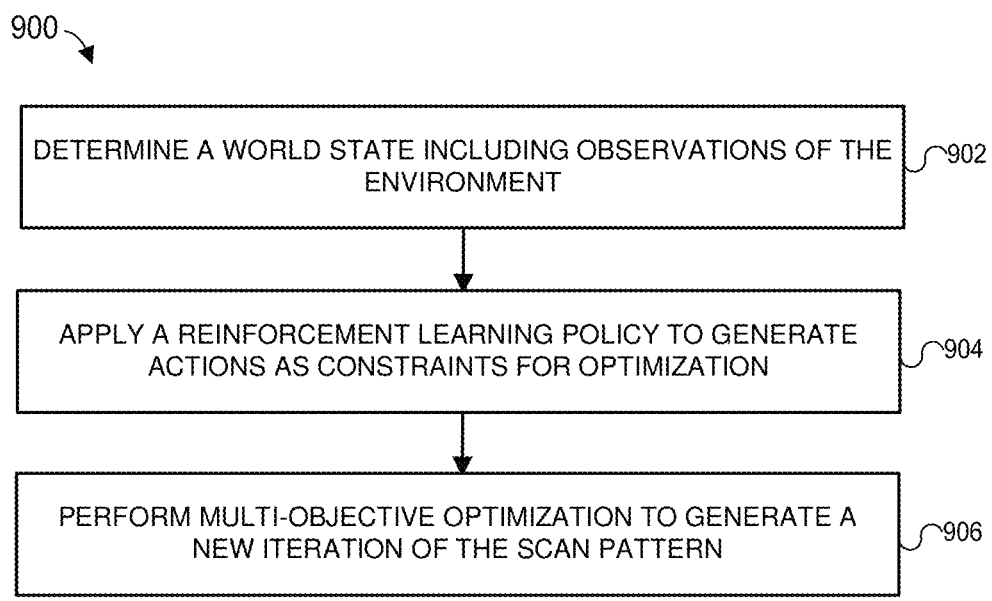
FIG. 9 is a flow diagram of an example method for implementing reinforcement learning in a cognitive lidar, which can be implemented in the system of this disclosure.
Figure 10:
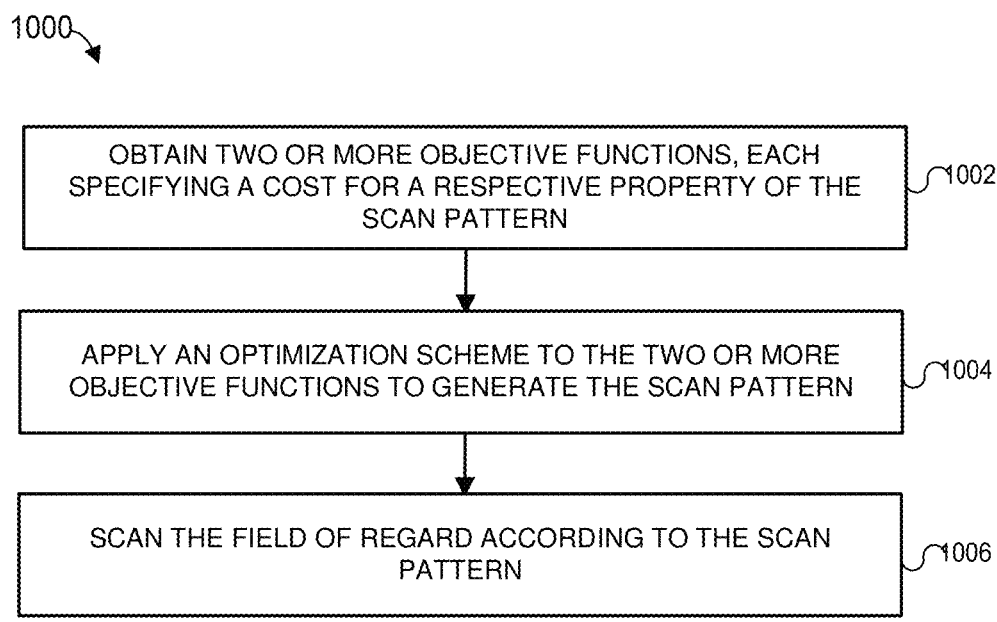
FIG. 10 is a flow diagram of an example method for determining a scan pattern according to which the cognitive lidar of this disclosure scans a field of regard.

For further clarity, several example methods which the cognitive lidar 100 can implement are discussed next with reference to FIGS. 8-10. Each of these methods can be implemented as a set of instructions stored on a non-transitory computer-readable medium and executed by one or more processors (e.g., the controller 250 of FIG. 2 of the vehicle controller 322 of FIG. 3). For convenience, the methods of FIGS. 8-10 are discussed below with reference to the cognitive lidar 100. However, in general these techniques can be implemented in any suitable system.

Figure 8:
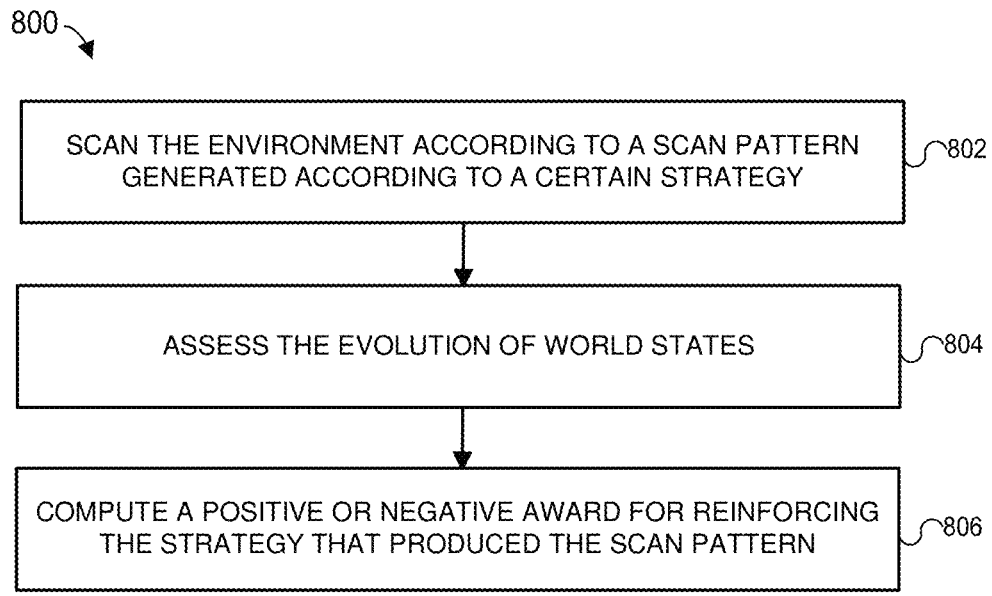
FIG. 8 is a flow diagram of an example method for training a cognitive lidar, which can be implemented in the system of this disclosure.

Referring first to FIG. 8, the cognitive lidar 100 can implement an example method 800 for training the RL policy of the cognitive lidar 100.

At block 802, the cognitive lidar 100 scans the environment according to a scan pattern generated according to a certain strategy. For example, as illustrated in FIG. 6, the scan pattern 602 can traverse the environment to determine the world state x(t).

At block 804, the cognitive lidar 100 assesses the evolution of world states. To continue with the example of FIG. 6, the cognitive lidar 100 can scan the environment to determine the world state x(t+1) and determine whether the evolution from the state x(t) to state the state x(t+1) is consistent with a higher-level goal such as staying in the lane or completing a maneuver.

Next, at block 806, the cognitive lidar 100 computes a positive or negative award for reinforcing the strategy that produced the scan pattern. For example, the cognitive lidar 100 can generate a positive value of the award (e.g., "1") when the RL strategy produced the expected result, such as avoiding collision. The cognitive lidar 100 can generate a negative value of the award (e.g., "−1") when the RL strategy produced a different result, such as failing to avoid the collision.

Thus, according to the method 800, the cognitive lidar 100 trains an RL policy based on higher-level goals which a lidar, or another sensor, typically does not pursue. Higher-level goals can be associated with perception or motion planning for example. In a sense, the cognitive lidar 100 acquires low-level operational parameters based on feedback from the higher layers of the autonomous stack.

FIG. 9 is a flow diagram of an example method 900 for implementing reinforcement learning in the cognitive lidar 100. The method 900 begins at block 902, where the cognitive lidar 100 determines a world state including observations of the environment (see, e.g., signals 534 of FIG. 5). At block 904, the cognitive lidar 100 applies an RL policy to generate actions, which are to be applied as constraints in optimization (see, e.g., signals 524 in FIG. 5). At block 906, the cognitive lidar 100 performs multi-objective optimization (see, e.g., block 520 in FIG. 5) to generate a new iteration of the scan pattern (see, e.g., signal 510 in FIG. 5).

Finally, FIG. 10 illustrates a flow diagram of an example method 1000 for determining a scan pattern, which the cognitive lidar 100 can implement. The method 1000 begins at block 1002, where the cognitive lidar 100 obtains two or more objective functions, each specifying a cost for a respective property of the scan pattern (see, e.g., signals 522 in FIG. 5). At block 1004, the cognitive lidar 100 applies a multi-objective optimization scheme to the two or more objective functions to generate the scan pattern (see, e.g., block 520 in FIG. 5). As discussed above, the multi-objective optimization scheme can be subject to constrains (e.g., maximum acceleration, maximum velocity, maximum angle at which linear segments of the scan pattern connect), which can be generated using RL techniques. At block 1006, the cognitive lidar 100 scans the FOR according to the generated scan pattern.

Thus, according to the method 1000, the cognitive lidar 100 performs a multi-objective optimization scheme to account for multiple objectives, and in some cases also incorporates higher-level goals related to object tracking, maneuvering, etc. in the form of optimization constraints.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A method of determining a scan pattern according to which a sensor equipped with a scanner scans a field of regard (FOR), the method comprising:
    obtaining, by processing hardware, a plurality of objective functions, each of the objective functions specifying a cost for a respective property of the scan pattern, expressed in terms of one or more operational parameters of the scanner, wherein the plurality of objective functions includes a velocity objective function specifying the cost for velocity at which the scanner scans a scan dimension of the FOR, and the velocity objective function (i) generates higher cost for higher velocity and (ii) calculates the cost of velocity based on a slope of a scanning segment and a length of the scanning segment, the slope corresponding to a displacement along the scan dimension over time;
    applying, by the processing hardware, an optimization scheme to the plurality of objective functions to generate the scan pattern; and
    scanning the FOR according to the generated scan pattern.

2. The method of claim 1, wherein the velocity objective function calculates the cost of velocity ($Cost_v$) according to:

$$Cost_v = (\text{the slope of the scanning segment})^2 * \text{the length of the scanning segment.}$$

3. The method of claim 1, wherein:
    the plurality of objective functions includes an acceleration objective function specifying the cost for acceleration at which the scanner changes velocity of scanning a scan dimension of the FOR, and
    the acceleration objective function generates higher cost for higher acceleration.

4. The method of claim 3, wherein the acceleration objective function calculates the cost of acceleration based on a difference between slopes of two scanning segments with a shared endpoint, the slope of each scanning segment corresponding to a respective displacement along the scan dimension divided by time.

5. The method of claim 1, wherein:
    the plurality of objective functions includes a coverage objective function specifying the cost for coverage of an area covered by the scan pattern, and
    the coverage objective function generates lower cost for higher coverage.

6. The method of claim 5, wherein the coverage objective function calculates the cost of coverage based on a difference between a given coverage and a maximum coverage available to the scanner.

7. The method of claim 1, wherein:
    the plurality of objective functions includes a rescan objective function specifying the cost for rescanning a region covered by the scan pattern, and the rescan objective function generates lower cost for a larger rescan region.

8. The method of claim 7, wherein the rescan objective function calculates the cost of rescanning the region based on a size of the region and a time interval between re-scans of the region.

9. The method of claim 1, wherein:
the plurality of objective functions includes a region-of-interest objective function specifying the cost for rescanning a region of interest covered by the scan pattern, and
the region-of-interest objective function generates lower cost for a larger region-of-interest region.

10. The method of claim 9, wherein the region-of-interest objective function calculates the cost of scanning the region of interest based on a size of the region of interest relative to an overall size of the FOR.

11. The method of claim 1, wherein:
the plurality of objective functions includes a drop-line objective function specifying the cost for dropping a scan line during a scan, and
the drop-line objective function generates higher cost for a larger number of dropped scan lines.

12. The method of claim 11, wherein the drop-line objective function calculates the cost of dropping the scan line based on an empirically determined relationship between acceleration of the scanner and a number of dropped scan lines.

13. The method of claim 1, wherein applying the optimization scheme includes applying a velocity constraint that specifies a maximum velocity at which the scanner is capable of scanning the FOR.

14. The method of claim 1, wherein applying the optimization scheme includes applying an acceleration constraint that specifies a maximum acceleration with which the scanner is capable of scanning the FOR.

15. The method of claim 1, further comprising:
applying, by the processing hardware, a reinforcement learning model to determine a lower boundary and an upper boundary for the one or more operational parameters of the scanner;
wherein applying the optimization scheme includes using the determined lower boundary and the upper boundary as optimization constraints.

16. The method of claim 15, wherein applying the reinforcement learning model includes iteratively performing:
determining, at a first time, a first world state by scanning the FOR in accordance with a first iteration of the scan pattern;
applying a policy of the reinforcement learning model based on the first world state to generate the lower boundary and the upper boundary; and
determining, at a second time, a second world state by scanning the FOR in accordance with a second iteration of the scan pattern generated by applying the optimization scheme and using the lower boundary and the upper boundary as optimization constraints.

17. The method of claim 15, further comprising training the reinforcement learning model by:
determining, at a first time, a first world state by scanning the FOR in accordance with a first iteration of the scan pattern;
applying a reinforcement learning policy based on the first world state to generate the lower boundary and the upper boundary;
determining, at a second time, a second world state by scanning the FOR in accordance with a second iteration of the scan pattern generated by applying the optimization scheme and using the lower boundary and the upper boundary as optimization constraints; and
determining a reward for the reinforcement learning model based on an evolution of the first world state to the second world state.

18. The method of claim 15, wherein applying the reinforcement learning model includes determining world states at respective different times using a lidar sensor that generates point clouds at the respective different times.

19. A lidar system comprising:
a light source configured to emit light pulses;
a scanner configured to scan a field of regard (FOR) of the lidar system including direct the light pulses at different angles toward different points within the FOR; and
a controller configured to drive the scanner to direct the light pulses across the field of regard, including:
obtain a plurality of objective functions, each of the objective functions specifying a cost for a respective property of a scan pattern, expressed in terms of one or more operational parameters of the scanner, wherein the plurality of objective functions includes a velocity objective function specifying the cost for velocity at which the scanner scans a scan dimension of the FOR, and the velocity objective function (i) generates higher cost for higher velocity and (ii) calculates the cost of velocity based on a slope of a scanning segment and a length of the scanning segment, the slope corresponding to a displacement along the scan dimension over time
apply an optimization scheme to the plurality of objective functions to generate the scan pattern, and
scan the FOR according to the generated scan pattern.

* * * * *